July 19, 1960  L. M. GREENE ET AL  2,945,375
AIRPLANE INSTRUMENTS
Filed Feb. 5, 1954  2 Sheets-Sheet 2
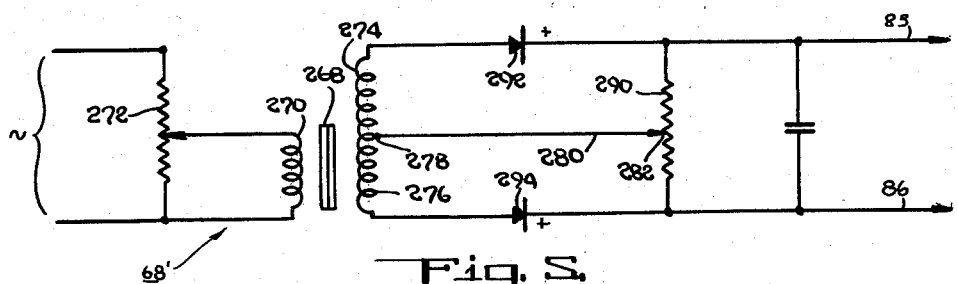
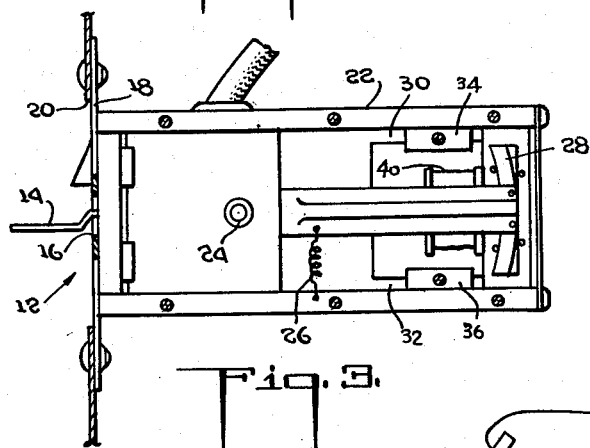
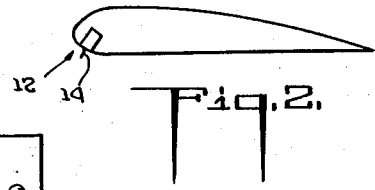
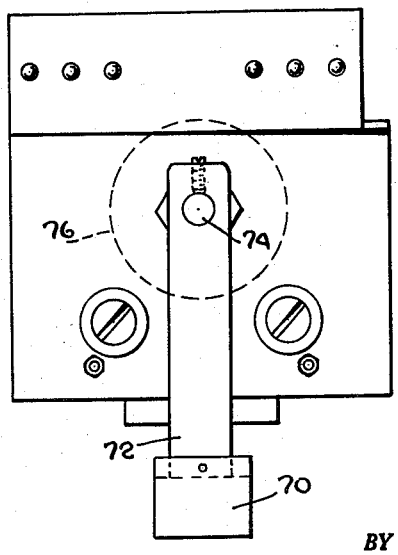
INVENTORS
LEONARD M. GREENE
DALE H. NELSON
BY
ATTORNEY

United States Patent Office 2,945,375
Patented July 19, 1960

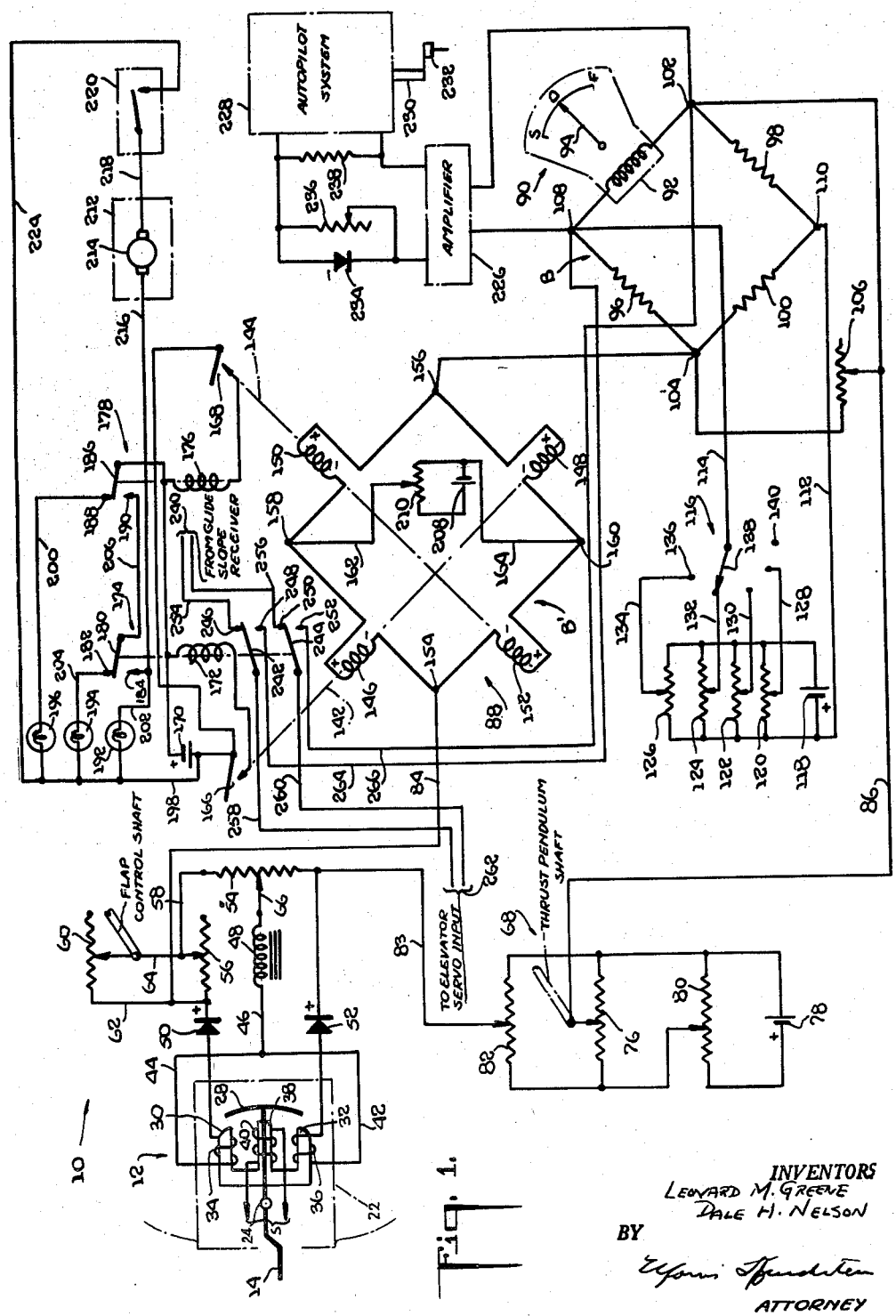

2,945,375

AIRPLANE INSTRUMENTS

Leonard M. Greene, Scarsdale, and Dale H. Nelson, White Plains, N.Y., assignors to Safe Flight Instrument Corporation, White Plains, N.Y., a corporation of New York Filed Feb. 5, 1954, Ser. No. 408,382

40 Claims. (Cl. 73—178)

This invention relates to airplane instruments.

In its general aspects, our invention pertains to an airplane instrument which indicates a variable flight characteristic that affects the safe operation of the airplane.

One phase of our invention is concerned with the operation of the instrument as a lift indicator. In relation to this phase it is an object of the present invention to provide an airplane instrument which will furnish a continuous, accurate indication of the percentage of available lift, will furnish such indication relative to a selectable null point, will if desired take into account variations in thrust as they affect lift and also, if desired, variations in other factors such as, for instance, flap position, altitude, throttle, etc. that likewise influence available lift, is accurate and quick in its response, and can, despite all of these advantages, be sold at a relatively low price.

Another phase of our invention is concerned with the means for sensing variation in pressure in the zone of influence of the shifting stagnation point on the principal air foil, it being an object of our invention to provide a novel means of this character, one which is capable of furnishing a continuous indication of variation of such pressure, rather than merely discrete point operation in advance of stall, which employs a unique mechanical and electrical arrangement that lends itself to simple and easy construction and rapid installation and incorporation in an electric circuit, and which can be regulated by changes in the circuit for the sensing means, rather than changes within the sensing means itself, to make adjustments and to take into account different flight conditions which influence such pressure.

It is another object of our invention to provide an airplane instrument of the character described which is free from parameter changes such as generated voltage and frequency, temperature, humidity and, in general, ambient changes on all equipment.

It is an additional object of our invention to provide an instrument of the character described wihch is capable of either continuous or discrete operation.

It is a further object of our invention to provide an airplane instrument of the character described which is adaptable for use, if desired, in connection with autopilot systems.

It is an ancillary object of our invention to provide an instrument of the character described in which control means such as relays are connected in the same series circuit as a reading instrument so as to be responsive to the same electric signal and yet are isolated from the instrument for discrete point operation.

It is another ancillary object of our invention to provide an instrument in which several electrically responsive devices are connected in series and yet can be individually subjected to adjustably different electrical variations which do not affect the other devices.

It is another ancillary object of our invention to provide an instrument having plural electrically responsive devices connected in a series circuit to react to a function of variation of electrical conditions in the circuit and each also arranged to react to a variation of electric conditions individually applied to less than all of the devices.

Other objects of our invention in part will be obvious and in part will be pointed out hereinafter.

Our invention accordingly consists in the features of construction, combinations of elements, and arrangements and connections of parts which will be exemplified in the instrument and circuits hereinafter described and of which the scope of application will be indicated in the appended claims.

In the accompanying drawings, in which are shown various possible embodiments of our invention, Fig. 1 is a diagram of a circuit for an airplane instrument constructed in accordance with the present invention;

Fig. 2 is a schematic sectional view of an airplane wing, showing in place therein a mechanism continuously responsive to pressure variations in the zone of influence of the shifting stagnation point, said mechanism embodying a feature of the present invention;

Fig. 3 is an enlarged sectional view through the mechanism illustrated in Fig. 2;

Fig. 4 is a front view of the mechanism for indicating variations in thrust; and Fig. 5 is a diagram of a modified form of thrust transducer adapted to be employed in the circuit of Fig. 1.

Referring now in detail to the drawings, the reference numeral 10 denotes a circuit including all of the various operative elements which make up an instrument embodying our present invention.

One of the essential parts of the instrument is a sensing means 12 responsive to the angle of attack of the wing, and more specifically as shown herein responsive to variation in pressure in the zone of the shifting stagnation point on the nose of the wing. Said means includes an element which is so located on the nose of the airplane wing that it is subjected to variation in pressure caused by shifting of the stagnation point over the nose of the wing. For example, the said element may comprise one or a plurality of orifices at the nose of the wing. As illustrated in the present application, said means is in the form of a vane 14 which extends through a slot 16 in a mounting plate 18 that is adapted to be secured over an opening 20 in the skin of the wing at the nose thereof.

The plate extends across and forms the front wall of a housing 22. Located in the housing is a pivot 24 for the vane, so that the vane is pivoted behind its center of pressure. The pivot extends parallel to the nose of the wing. Suitable means, such for example as a spring 26, is provided to bias the vane in a forward direction. As will be appreciated from the description of the operation of the sensing means set forth in detail hereinafter, the particular location of the vane in the nose, the strength of the spring, and the direction in which the spring biases the vane are not critical for proper performance of the instrument.

The physical movement of the sensing means is transduced to a variation in an electrical quantity. In general this is performed by having an element which moves with movement of the vane and is shiftable between a pair of members the nature of each of which is such that an electrical characteristic thereof, such for instance as capacity, inductance, induced voltage or resistance, changes with change in the relative position of the element and members. The members are so arranged in circuit that the combined changes of the two members provide a signal output which varies by a meterable electric circuit change—e.g., a change in magnitude. The changeable electric characteristic of each member should be readily capable of giving a polar indication per se, so that it can be determined which of the two members is being approached or left by the element, or alternatively said characteristic can be changed or modified to include a polar characteristic.

More specifically, and as shown herein, an armature 28 made, for example, of soft iron is carried on the vane in back of the pivot 24. Desirably, although not essentially, said armature is of arcuate shape, with its center of curvature at the pivot 24. The armature moves in a path of travel past the upper and lower arms 30, 32, of an E-shaped core. A secondary coil 34 is wound on the arm 30 and another secondary coil 36 on the arm 32. The central arm 38 of the magnetic core has exciting coil 40 wound around it. It may be mentioned that it is not necessary for the various arms 30, 32, 38 to form part of a single core. If desired, the coils 34, 36, 40 can have non-magnetic centers and only be magnetically coupled by lines of force running through the armature 28.

It will be appreciated that with this arrangement the inductive excitation of the coils 34, 36 will vary with changes in location of the armature 28. When the armature moves toward the core 30, for example, the inductive excitation of the coil 34 will be increased, and similarly, when the armature 28 moves toward the core 32, the inductive excitation of the coil 36 will be increased. Increase in excitation of either secondary coil is accompanied by decrease in excitation of the other secondary coil.

The exciting coil 40 is energized in any suitable manner, for example from an A.C. source of electric power, like the 115 volt, 400 cycle power source commonly found on airplanes. The exciting coil 40 has an impedance of 150 ohms at 400 cycles and the coils 34, 36 an impedance of 4,000 ohms apiece at 400 cycles. (The values of the various electrical elements will be given throughout the specification by way of example and without limitation.) Two terminals 42, 44 of the coils 34, 36 are joined and connected in common to a lead wire 46 which runs to a choke 48 having an inductance of 1.8 henries. Said choke prevents variations in voltage or frequency of the A.C. power source used to energize the exciting coil 40 from causing a change in the ratio of the electrical output of the two coils 34, 36 of the sensing means. The other ends of the coils 34, 36 are connected respectively to uni-directional conducting devices, such for instance as rectifiers 50, 52. Both rectifiers conduct in the same direction, the positive sides of the rectifiers in the circuit illustrated being away from the coils 34, 36. The positive side of the rectifier 52 is connected to one end of the 5,000 ohm resistance of a null potentiometer 54. The positive side of the other rectifier 50 is connected to the other end of the resistance of the null potentiometer, this connection being effected through a 5,000 ohm variable resistance 56. One side of said variable resistance is connected to the rectifier 50, and the null potentiometer is connected by lead wire 58 to the arm of the variable resistance. A 6,000 ohm variable resistance 60 is connected across the variable resistance 56 by lead wires 62, 64.

The value of the resistance 60 varies in response to the position of the flaps. The arm of said resistance is positioned to provide substantially zero resistance when the flaps are up, and as the flaps are let down said arm increases the resistance in proportion to the position of the flaps.

The variable resistance 56 is manually controlled, being conveniently located, for example, in the cockpit. Movement of this second resistance will vary the effect of flap condition resistance 60 in any given position thereof.

It thus will be observed that the leg of the circuit from the secondary coil 34 to the null potentiometer 54 through the rectifier 50 includes a resistance which varies with flap condition and the magnitude of which is independently variable with the setting of flap amplitude resistance 56. The flap amplitude resistance only is adjusted at the time that the instrument is installed, or if it is desired to make the instrument more sensitive to flap condition at some subsequent time; but it is not changed by the pilot during flight.

The choke 48 is connected by a lead wire 66 to the arm of the null potentiometer.

When the instrument is installed, the arm of the null potentiometer is moved to a position such that the voltage across the potentiometer is zero for some one condition of flight. A preferred setting for the null potentiometer is maximum lift in calm air during landing approach, the flap condition variable resistance being in its flap "up" position. With the null potentiometer arm so set, the voltages generated in the coils 34, 36 and rectified in the rectifiers 50, 52 are perfectly balanced across the potentiometer 54.

It will be seen that it is due to this arrangement that the location of the vane, direction of biasing, and strength of the biasing spring are not critical, inasmuch as with any values of these factors a null point still can be obtained by shifting the null potentiometer arm. It will be appreciated that this construction and circuitry is far superior to delicate and critical adjustments of the vane position and of the spring.

The arrangement has the further advantage that the sensing means in effect forms part of a bridge, of which the coils 34, 36 constitute two legs and the two parts of the null potentiometer on opposite sides of the null arm constitute the other two legs. The two coil legs are exposed to ambient conditions which vary very widely, temperature changes as much as from −60° to 340° Fahrenheit being encountered. However, since both legs of the bridge are similarly exposed to ambient conditions, they are affected to a like degree and thus changes in ambient conditions which otherwise would affect the sensing means are cancelled out. For example, if the mechanism for transducing physical movement of the vane to a change in an electrical value were a single variable inductance and were exposed to ambient conditions, as it must be if it is to be located close to the vane, the value of the resistance portion of this inductance, and therefore its total impedance, would fluctuate very markedly between the extreme temperature limits, because there is no compensating factor such as the use of the two coils 34, 36 in a bridge circuit.

It also is desired to point out that by using a null point measurement in the circuit which forms part of the sensing means that is responsive to changes of pressure in the zone of influence of the shifting stagnation point, we have rendered the instrument free from parameter changes such as generated voltage and frequency, temperature, humidity, and ambient changes of various types experienced by the equipment.

Furthermore, by balancing the sensing circuit to a null point electrically, adjustment of the null point can be made in flight and therefore the instrument can be quickly set, this being distinguishable from the physical balancing of the vane which heretofore could not be practiced in flight.

It will be appreciated that the null point balancing provides in effect a comparison of the variable electric output of the two coils 34, 36 which is effected in the lift transducer by movement of the vane. That is to say, if the electric variable—i.e., voltage—generated in the coil 34 upon movement of the vane becomes larger than it was at the null point setting, and the voltage generated in the coil 36 upon the same movement of the vane decreases, the output of the null circuit constitutes a signal that indicates this change. Similarly, a change in the opposite direction will be shown by a signal of opposite sign which thereupon will comprise the output of the null circuit.

It will be understood that comparison of the two voltages generated in the secondary coils will show that one is larger than the other, if there is a shift from the null position. Nevertheless, if the voltages opposed across the resistance simply are A.C., the output of the sensing circuit only will show that there has been a change from the null position—i.e., an imbalance—but will not tell in which direction the change occurred.

If the shift of the stagnation point is such that the wing approaches stall, the vane will shift the armature 28 in a direction to induce an increased voltage in the coil 36. For an opposite shift of the stagnation point, induced voltage will be increased in the coil 34. Inasmuch as a shift of stagnation point towards stall generally indicates that the speed of the airplane is too slow for its attitude, the coil 36 is referred to as the "slow" coil. Similarly, the coil 34 is referred to as the "fast" coil.

It is to enable the output signal of the sensing circuit to constitute a vector signal—i.e., one which indicates a shift of phase as well as of magnitude—that the rectifiers 50, 52 are employed. Due to these rectifiers a shift of the null point to the fast side will create a positive signal at the upper end of the null potentiometer as viewed in Fig. 1 (the said upper end of the potentiometer will be more positive than the lower end), while a shift to the slow side will cause a positive signal to appear at the lower end of the null potentiometer, as viewed in Fig. 1.

It thus will be apparent that the resultant voltage appearing across the null potentiometer has a magnitude and sign which are a continuous function of the lift and will vary in magnitude and phase to both sides of any selected null lift condition, modified by the desired flap-controlled resistance 60, so that the resultant voltage represents the lift modified by the flap condition.

The instrument also includes a thrust transducer 68—that is to say, a means which is responsive to the thrust of the engine and which will provide a variable electric signal that fluctuates in response to changes in thrust. It is desired to point out that the thrust delivered by the engine has a very great effect on the lift of the wing. Indeed, at maximum lift the thrust may constitute a major factor. Under many conditions the effect of thrust is double the effect of the flap.

The means physically responsive to thrust can take on any desired physical form. For example, it may be a pendulum, or a longitudinal accelerometer, or a throttle control position measurement device, or an engine torque meter, or a manifold pressure measurement device, or a propeller slipstream measurement device, or a jet pressure measurement device, or an engine exhaust measurement device. In the prefered form of our invention shown herein, said means comprises a pendulum. Similarly, the electric variable controlled by a movement of the thrust responsive physical device may be of any desired nature and most simply may comprise a resistance—e.g., a potentiometer.

More particularly, the pendulum includes a weight 70 at the end of a pendulum arm 72 mounted on a shaft 74 that is journaled for rotation about a horizontal axis perpendicular to the longitudinal axis of the airplane. Preferably, said shaft 74 comprises the resistance varying shaft of a 500 ohm thrust transducer potentiometer 76. Voltage is supplied to the thrust transducer potentiometer by a battery 78 which is connected across the resistance of a 1,000 ohm thrust magnitude potentiometer 80. One end of the said resistance is connected to one end of the thrust transducer resistance, and the arm of the thrust magnitude potentiometer is connected to the other end of the thrust transducer resistance. Thereby, the magnitude of the voltage supplied to the thrust transducer resistance by the battery 78 can be varied at will. The resistance of the thrust transducer is connected in parallel with the resistance of a 5,000 ohm thrust null potentiometer 82, the arm of which is connected by lead wire 83 to one side of the signal output of the lift sensing circuit—e.g., to the lower end of the resistance of the lift null potentiometer 54. The arm of the thrust null potentiometer is set to attain zero potential at some one condition of flight. A preferred setting is the condition present during landing approach.

It will be seen that the two signal outputs of the lift transducer and the thrust transducer are combined to provide a single signal which is a function of both thrust and lift. The signal is developed across the two points constituting the arm of the thrust transducer potentiometer and the lead wire 62.

Pursuant to the present invention, this signal can be used for an indicating mechanism that shows the fraction of lift at which an airplane is operating under any given conditions. The indication need not necessarily be in terms of percentage. Thus it may be presented, for instance, by indicating to the pilot whether the airplane is flying too fast or too slow. During a landing approach the instrument provides a continuous indication of the relationship of the airplane speed to a proper speed or landing. Obviously, if the airplane is flying too slow, there would be danger of stall, and if too fast, of overrunning the landing area. At times other than landing, the signal can be weighted electrically to take other factors into account in the reading of the instrument.

In addition, the combined output signal of the lift and thrust transducers can be employed to operate control mechanisms for discrete point conditions. For instance, such mechanisms may operate signals which indicate that stall is imminent or that speed is so high that the landing area will be overshot.

Moreover, if desired, the combined signals from the two transducers may control a mechanism for regulating some settable condition of the airplane—e.g., speed. In this manner the combined signal can govern the operation of an autopilot system which regulates the throttles of the airplane engines, so that the speed of the airplane can be held at a value such that operation is maintained at a safe condition, neither too slow nor too fast, for any particular operation.

As will be apparent hereinafter, operation of all three classes of mechanisms by the combined signal can be varied to take into account different factors, as for instance under what conditions the airplane is being flown—that is to say, landing, take-off, climb, endurance, or range. For each of these factors a different speed may be optimum.

Referring back to the circuit of Fig. 1, the combined signal of the lift and thrust transducers appears on the wires 84, 86. This signal is a D.C. signal which varies in magnitude and sign. Said signal is applied to one or more mechanisms in series. As illustrated herein, we have shown the signal applied to only two mechanisms 88, 90, it being understood, however, that, if desired, additional mechanisms may be added.

For reasons which will be apparent as the description proceeds, it sometimes is desirable to regulate operation of a mechanism by the combined signal of the two transducers and an additional signal as well. The latter signal may be any type of variation in electrical values and, as shown herein, constitutes a second voltage which varies in magnitude. We have provided special circuit means to prevent this second voltage in any given mechanism from interfering with the operation of any of the other mechanisms. Such circuit constitutes the incorporation of each mechanism in a balanced bridge which is inserted in the series circuit to which the combined signal of the transducers is applied.

It also should be observed that the use of a balanced bridge circuit for each mechanism enables operation of the several mechanisms to be isolated from one another without introducing an unduly high impedance.

The mechanism 90 comprises a meter 92 which is sensitive to changes in the variable electric condition, in this present case to a change in magnitude and sign of voltage. When the voltage applied to the meter terminals is zero, the needle 94 of the meter is located at an intermediate point of its scale—for example, the central point. The needle will swing to one side or the other of its zero position, depending upon the sense of the voltage applied to its terminals, and the magnitude of the swing will be a function of the magnitude of the voltage.

In the example of our invention herein being described the D.C. resistance of the meter is 240 ohms. The adjacent leg of the meter bridge B consists of a resistance 96, whose value is the same as that of the meter 92, to wit; in the example given, 240 ohms. Each of the other two legs of the bridge B consists of a resistance which is high in comparison to that of the meter and resistance 96. As shown herein, these resistances, 98, 100, have values of 4700 ohms. Due to this relative value of the resistances the major portion of current flow will take place in series through the two low resistance legs 92, 96, so that isolation between the instruments is obtained by, in effect, only doubling the resistance of the instrument.

A voltage which is a function of the combined signal voltage of the two transducers is applied to the junction points 102, 104 of the bridge B, where the low resistances are connected to the high resistances. It will be obvious that the deflection of the meter is proportional to the signal voltage imparted by two transducers. When the combined voltage is zero, the meter will be at its zero point. When the combined voltage is such that the signal on the lead wire 84, which is the fast side, is more positive than the signal on the lead wire 86, the needle will be deflected in a direction to indicate that the airplane is going too fast. When the combined voltage is such that the signal on the lead wire 86, which is the slow side, is more positive than the signal on the lead wire 84, the needle will be deflected in a direction to indicate that the airplane is going too slow.

The magnitude of the voltage applied to the instrument 90 can be adjusted by a 5,000 ohm variable resistance 106 which is shunted across the terminals 102, 104 of the bridge B. Said resistance 106 is varied to control the over-all swing of the needle 94 and is an adjustment which is not changed by the pilot.

The other two terminals of the bridge B, at the junction 108 between the low resistances and the junction 110 between the high resistances, are connected by lead wires 112, 114 to a multi-position switch 116 which allows selectible voltages to be applied to these two junctions. The resultant current circulates only through the bridge resistances and does not appear in the outside circuit, since the bridge is balanced. However, it causes a modifying voltage to be applied to the meter 92 and thereby affects its indication. The voltages are derived from a battery 118 across which the resistances of a plurality of 2,500 ohm potentiometers 120, 122, 124, 126 are connected in parallel. One side of each said resistance is connected to the lead wire 112. Lead wires 128, 130, 132, 134 connect the arms of the potentiometers to different contacts 136 of the switch 116. The movable arm 138 of the switch is connected to the lead wire 114. The switch includes one dead contact 140.

When the switch arm 138 is on the dead contact, no voltage is applied to the bridge B except the combined signal voltage of the lift and thrust transducers and therefore under this condition, which, as described hereinabove, is for landing approach, the meter 92 will be responsive only to the combined signal of the two transducers, which are set to provide a null—i.e., zero—indication in the meter at the correct thrust and maximum safe lift during landing approach.

When the switch arm 138 is turned to engage any of the other contacts, an additional voltage will be applied to the meter which will be a function of some condition or of some variable other than lift or thrust. For example, the potentiometer 126 is set at such a position that when the voltage derived therefrom and applied to the lead wires 112, 114 is added to the combined signal voltage applied by the two transducers, the meter 92 will have its needle at null when the speed of the airplane corresponds to the speed which will achieve the maximum range. Said potentiometer 126 is set from knowledge of the constants which influence the operation of the airplane—that is, to take into account all factors other than lift and thrust which will enable the most mileage to be obtained from the fuel. The potentiometer 124 is controlled by the altitude of the airplane, so that the electric output secured from the same corresponds to the barometric pressure. When the switch arm 138 is turned to render this potentiometer effective, the meter 92 will vary with variations in altitude, as well as with variations in lift and thrust, so that the meter will indicate deviation from a speed which is optimum for the altitude at which the airplane is flying. The potentiometer 122 is set to obtain the best endurance—that is to say, maximum length of flight time—when its selected voltage is applied to the lead wires 112, 114. The potentiometer 120 is employed when it is desired to use the voltage drop across the meter to control an autopilot system which will be described hereinafter. The resistance value of this potentiometer is manually controlled by the pilot.

The particular functions of the several potentiometers 120, 122, 124, 126 described above are merely exemplitive, and it will be understood that there are many other conditions and variables which can be employed to control these or other potentiometers, as for example best climb, the position of the landing gear, sundry limit switches, a bombs away switch, droop nose position, icing, slats and spoilers. In general these potentiometers enable us to select different electrical values to be applied to the bridge B for different performance optima.

The second mechanism 88 which is actuated by the combined output signal of the two transducers is a control type mechanism for operation at discrete points in contradistinction to the continuous indicating type mechanism 90. Said mechanism 88 is wired in the form of a bridge B' in order that any external voltage applied thereto, other than the combined signal output voltage of the two transducers, will not affect the mechanism 90 and also to reduce the resistance added by said control mechanism 88 to the load circuit for the transducers.

To this end the control mechanism comprises two relays 142, 144. The relay 142 is referred to as the "slow" relay, and the relay 144 as the "fast" relay. Both of these relays are polarized—that is to say, they will sense differences in the sign of the voltage applied to their terminals. Each relay includes two actuating coils. More specifically, the relay 142 includes an actuating coil 146 and a second actuating coil 148. The relay 144 includes an actuating coil 150 and a second actuating coil 152. The D.C. resistance of each of these actuating coils is 2,150 ohms. Said actuating coils are connected in a bridge circuit with the actuating coils of each relay on opposite sides of the bridge, as clearly shown in Fig. 1. The junctions 154, 156, where the actuating coils 146, 152 and the actuating coils 148, 150, respectively, meet are connected in the series circuit for the combined signal output of the two transducers. The other two junctions 158, 160 are connected to lead wires 162, 164.

Both relays 142, 144 are electromechanical relays which when current flows through their actuating coils in a given direction and in a suitable magnitude will move contacts to an operated position. Flow of current in the opposite direction, regardless of magnitude will not operate the contacts. To simplify the description, in Fig. 1 a plus and a minus sign has been placed at opposite ends of each of the actuating coils. When the voltage applied to any given actuating coil corresponds to these signs—that is to say, when the applied voltage is positive at the end of the coil marked with a plus and negative at the end of the coil marked with a minus, the relay will be actuated.

The relay 142 controls a normally open pair of contacts 166 which are closed when said relay is actuated. The relay 144 controls a normally open pair of contacts 168 which are closed when said relay is actuated. The contacts 166 are in a series circuit including a battery 170 and an actuating coil 172 of a power relay 174. The contacts 168 are in another series circuit including the same source of electric energy 170 and an actuating coil 176 of a second power relay 178.

The relay 174 includes a contact 180 movable between a pair of stationary contacts 182, 184, the movable contact being biased against the stationary contact 182. The relay 178 includes a contact 186 movable between a pair of stationary contacts 188, 190, the movable contact being biased against the stationary contact 188.

The control mechanism 88 governs the operation of three signals, which may be of any suitable type, being illustrated herein as visual signals, for instance three electric lamps 192, 194, 196. Each of the lamps desirably is differently colored to facilitate recognition of the condition which energization of the signal denotes. Thus, for instance, lamp 196 is red and when energized denotes that the speed of the airplane is too fast; lamp 194 is amber and when energized denotes that the speed of the airplane is in an acceptable range; lamp 192 is green and when energized indicates that the speed of the airplane is too slow and therefore that stall is imminent.

All the lamps are energized from a suitable source of energy—e.g., the battery 170. A lead line 198 connects one side of the battery to one side of each lamp. A lead line 200 connects the other side of the lamp 196 to the stationary contact 188. A lead line 202 connects the other side of the lamp 192 to the stationary contact 184. A lead line 204 connects the other side of the lamp 194 to the stationary contact 182. A lead line 206 connects movable contact 180 to stationary contact 190.

With no voltage applied from an external source to the lead wires 162, 164 and with the position of the vane 14 such that the fast coil 34 develops a voltage of greater magnitude than the slow coil 36, lead wire 84 will be more positive than lead wire 86, and the potential at junction 154 will be positive with respect to the potential at junction 156. Hence the potential will be of the wrong sense to operate either of the relays 142, 144. Since the relays are unactuated, the movable contacts 180, 186 are in engagement with the stationary contacts 182, 188. Under these conditions, no potential will be applied to either of the lamps 192, 194, but potential is applied to the lamp 196, which thereupon is energized. It will be noted that as long as contact 186 is off contact 190 contact 180 is dead so that neither lamp 192, 194 can be energized.

If the vane 14 shifts so that the armature 28 favors the slow coil 36, the potential on lead wire 86 will be positive with respect to the potential on lead wire 84 whereby the sense of the signal voltage is proper for energization of both relays 142, 144. With both of these relays energized the movable contacts 180, 186 will shift into engagement with the stationary contacts 184, 190, respectively. This removes potential from the lead wire 200 and de-energizes the lamp 196. It also prevents application of potential to the lamp 194 and causes voltage to be applied to the lamp 192.

It will be observed that, as thus far described, either the "fast" lamp 196 or the "slow" lamp 192 will be energized, but never the lamp 194 indicating a correct range of speed.

The mechanism 88 further includes a means for spreading the points of energization of the fast and slow signal controls so as to provide a range indicating safe operation. This is accomplished by applying potential from an external source of electricity to the leads 162, 164. For this purpose, we provide a battery 208 across the resistance of a potentiometer 210. One end of said resistance is connected to the lead wire 164, and the movable arm of the potentiometer is connected to the lead wire 162. The battery is so oriented in the circuit that positive potential is applied thereby to the lead wire 164.

With this arrangement the voltage supplied by the battery 208 is applied in a direction to operate the relay 144 and prevent operation of the relay 142. Hence, for a null condition of the two transducers, the relay 144 will be closed and the relay 142 open. At a null condition the airplane obviously should be flying at a correct speed. Energization of relay 144 actuates the movable contact 186, engagement with the stationary contact 188 is broken so that the "fast" lamp 196 is de-energized. The contact 186 engages the contact 190 to place potential on the lead wire 206. Said potential is applied through movable contact 180 and stationary contact 182 to lead wire 204 and the "safe" lamp 194.

To energize the lamp 196 and thereby indicate that the airplane is going too fast, the positive potential developed in the lead wire 84 with respect to the lead wire 86 must exceed the positive potential applied to the lead wire 164 by the battery 208 at any given setting of the potentiometer 210. Hence, by setting this potentiometer we can regulate the point at which the signal indicating that the airplane is flying too fast will be energized.

Conversely, to operate the relay 142 with the relay 144 previously energized, it is necessary for the vane 14 to shift to the slow side sufficiently for the positive potential developed on the lead wire 86 with respect to the lead wire 84, to overcome the electrical bias against actuation of this relay supplied by the battery 208 and the potentiometer 210. When this bias is overcome, both relays are in actuated condition and the "slow" lamp 192 will be energized.

It now will be apparent that the spread between operation of the lamps 192, 196 can be varied by adjusting the potentiometer 210.

It is desirable to incorporate signaling means of types other than visual which are actuated upon the presence of imminent stall. One or more such means can be used, as for example an audible warning, like a horn, or a kinesthetic warning such as is illustrated in the circuit of Fig. 1. Said warning comprises a vibratory aircraft alarm 212 of the rotary eccentric weight type, like that shown, described and claimed in U.S. Patent No. 2,566,409, issued September 4, 1951. One terminal of the motor 214 of said alarm is connected by a lead wire 216 to the stationary contact 184. The other terminal is connected by a lead wire 218 through a switch 220 and a lead wire 224 to the battery 170. The switch 220 is a fluid-operated switch which is responsive to the condition of the fluid in the hydraulic system for the airplane undercarriage. When there is no pressure in the system (the wheels are up), the contacts in the switch 220 are closed. Said contacts stay closed even when sufficient pressure is introduced into the system to let down the landing wheels. However, when the pressure in said system increases upon the wheels touching ground the contacts of the switch 220 open. Thus the alarm never can be energized when the airplane is on the ground, but at any time after it is airborne and the two relays 142, 144 are actuated to place potential on the stationary contact 184, the alarm 212 will be energized.

The instrument also includes a mechanism for automatically controlling the speed of the airplane, preferably by means of the engine throttle or throttles. Since departure of the needle 94 from its central—i. e., null—position indicates too fast or too slow a speed, which can be corrected by increasing or decreasing the thrust of the airplane, the signal applied to the instrument 92 can be employed to control the throttles. Inasmuch as only a small current is available in the bridge B, we provide an amplifier 226 across said instrument. Said amplifier feeds into a conventional autopilot system 228 having an output shaft 230 which is mechanically linked to the engine throttles 232. Thus, as the signal applied to the meter indicates that the air speed is too slow, the autopilot system also will act on said signal to automatically depress the throttle and thereby increase the air speed, and vice versa. The autopilot system will function to maintain air speed at a correct value under any condition selected by the switch 138, and it is noted that when the potentiometer 120 is connected in circuit, this having been described as the potentiometer corresponding to the autopilot system, the autopilot system is biased by manual control. It will be understood that a suitable uncoupling means such as is well known in the art is included, so that the autopilot system only is engaged with the engine throttles when desired.

Means is included to incorporate a safety factor in the operation of the autopilot system. It will be apparent that when the sense of the signal amplified by the amplifier 226 is a predetermined one, as for example more positive at the junction 108 than at the junction 102, the autopilot system will act to correct the condition which has created the signal—in this instance, to slow down the motors by pulling back on the throttles. When the signal is in the opposite sense, the amplified signal fed to the autopilot system will cause said system to depress the throttles so as to speed up the engines. Under most circumstances, it is more dangerous for the airplane to fly too slow than too fast. We provide a means which takes advantage of the aforesaid mode of operation of the autopilot system to incorporate a safety factor by making said system more responsive to a speed increasing than to a speed decreasing signal so that the average speed of the airplane will be greater than the speed corresponding to the null point at any given setting of the circuit.

We accomplish this differential sensitivity by inserting two impedances in the connection between the amplifier 226 and the autopilot system 228. One of these impedances consists of a rectifier 234 and the other of a variable resistance 236. Said impedances are connected in parallel. The rectifier 234 is so oriented in the circuit that it will freely pass current when the sense of the combined signal of the lift and thrust transducers is such as to indicate that the speed is too slow. To insure flow of current in this section of the circuit a load resistance 238 is shunted across the input to the autopilot system. Therefore, such a signal will secure a quick response of the autopilot system. A signal indicating that the airplane is going too fast, and needs movement of the throttles such as to reduce the speed, is completely blocked by the rectifier 234. However, it can pass but with a reduction of signal strength through a variable biasing control resistance. Due to this arrangement, the autopilot system will respond more slowly to a signal calling for a reduction of speed. By thus having different speeds of response of the autopilot system to signals of opposite sense, the average speed will be greater than the critical stall speed and accordingly, as the speed of the airplane fluctuates—for example, in rough air—the airplane will fly at a safer average speed.

It is desirable to include another means which provides an additional safety factor in the operation of the autopilot system. Said means avoids stalling when the lift sensing means calls for more power (throttle opening) than can be accomplished. This means operates to override the signal operating the elevator control, which might normally be the output 240 of an ILS Glide Slope Receiver.

To this end we provide the power relay 174 with two movable contacts 242, 244 operating between stationary contact pairs 246, 248 and 250, 252 respectively. The movable contacts normally are closed on the upper stationary contacts 246, 250. Said stationary contacts 246, 250 are connected by lead wires 254, 256 to the output 240 of the ILS Glide Slope Receiver. The movable contacts 242, 244 are connected by lead wires 258, 260 to the input 262 of the elevator control which, typically, is the elevator servo input. The other stationary contacts 248, 252 are connected by lead wires 264, 266 to the junctions 102, 108.

In making an automatic landing the Glide Slope signal 240 may call for an elevator action increasing the angle of attack of the airplane beyond the point where the available power (throttles wide open) can maintain the required safe margin over stall. The situation is immediately detected by the sensitive polar relay 142 which closes at the desired warning (minimum safe margin) point, this relay in turn operating the power relay 174 which by flipping the movable contacts 242, 244 switches control of the elevator from the Glide Slope Receiver to the lift computer (combined signal of the lift and thrust transducers). The elevator then responds temporarily to the lift intelligence to maintain the airplane at the minimum safe margin above stall. As soon as sufficient lift margin is developed to deenergize the polar relay 142 at the "safe" condition, the elevator control circuit will be restored to normal, i.e. under the influence of the ILS Glide Slope Receiver output. If the Glide Slope signal still calls for too severe an elevator action, the cycle will be repeated, but it will be apparent that the elevator will stay substantially under the control of lift intelligence during this period.

The circuit 10 is capable of being prepared for operation in various ways. For example, the values of all the circuit constants are known and from these, knowing the characteristics of the airplane, the different variable resistances and potentiometers which are condition responsive can be set. A simpler manner is to install the circuit and operating elements in an airplane which is typical of a class and make the settings experimentally, whereupon they can be reproduced in other airplanes of the same class.

Thus, to set the lift null potentiometer 54 the flap condition potentiometer 60 is turned down to zero resistance with the flaps up. The thrust amplitude potentiometer 80 is turned to zero resistance, so that no potential is applied to the thrust transducer potentiometer 76 or the thrust null potentiometer 82. Accordingly, although the values of the resistances of these two potentiometers will vary with the changing flight conditions during adjustment of the circuit, they will not affect the voltage balance of the combined lift and thrust transducer signals.

The airplane is flown in some condition which arbitrarily is selected and which is approximately midway between imminent stall and excessive air speed. A suitable condition is the attitude of the airplane during landing approach. The movable arm of the lift null potentiometer 54 is varied until the needle 94 of the meter 92 is at its central—i.e., null—point.

Thereafter, the thrust amplitude potentiometer 80 is moved to the position of maximum resistance which will enable the thrust transducer to apply a maximum voltage signal. Then, while the airplane continues to be flown in a proper manner for landing approach, the movable arm of the thrust null potentiometer 82 is adjusted until needle 94 of the meter 92 is at its null position.

The effect of variations in thrust on the reading of the meter 92 can be changed by varying the thrust amplitude resistance 80. Likewise, the effect of the flap condition can be varied by changing the flap amplitude resistance 56. Both of these will affect the combined signal output of the two transducers—that is, they will affect the location of the null point.

The amplitude of the combined signal is not material, inasmuch as the mechanism 88 has its own amplitude adjustment in the form of the slow-fast spread potentiometer 210, and the meter 92 has its own amplitude adjustment in the form of the gain potentiometer 106.

In Fig. 5 we have shown a modified thrust transducer 68' which can be inserted in the circuit 10 between the lead wires 83, 86 in place of the thrust transducer 68.

Said transducer 68' includes a suspended slug 268 of soft iron mounted for free rotation about a horizontal axis in a vertical plane including the longitudinal axis of the airplane. The slug moves in a path of travel past a 150 ohm exciting coil 270 which draws its current from a manually variable 500 ohm thrust amplitude control potentiometer 272 that is energized from a 26 volt 400 cycle A.C. power source. The slug while electro magnetically coupled to the exciting coil moves under the influence of gravity, airplane attitude and thrust from one to the other of two secondary coils 274, 276 each having a 500 ohm impedance.

Two terminals of the coils 274, 276 are joined at a common junction 278 from which a lead wire 280 runs to the variable contact 282 of a 1000 ohm thrust null potentiometer 290.

The other terminals of the coils 274, 276 are connected respectively to rectifiers 292, 294 conducting in the same direction, the positive sides of the rectifiers being away from the coils 274, 276.

A 4 mfd. condenser may be connected across the thrust D.C. voltage output to minimize the half-wave rectification ripple.

It thus will be seen that we have provided a device which achieves the several objects of our invention and is well adapted to meet the conditions of practical use.

As various possible embodiments might be made of the invention, and as various changes might be made in the embodiment above set forth, it is to be understood that all matter herein described or shown in the accompanying drawings is to be interpreted as illustrative and not in a limiting sense.

Having thus described our invention, we claim as new and desire to secure by Letters Patent:

1. An airplane instrument comprising an electrical element having a variable electrical characteristic, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing, and means for continuously varying said electrical characteristic responsive to the orientation of the vane.

2. An airplane instrument comprising an electrical element having a variable electrical characteristic, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said electrical characteristic responsive to the orientation of the vane, an electrical utilization mechanism adapted to be regulated by a lift ratio, and circuit means connecting said utilization mechanism for control by said electrical characteristic.

3. The combination with an airplane wing having a stagnation point which shifts over the nose of the wing with variation in angle of attack, of an electrical element having a variable electrical characteristic, a vane projecting from the nose of said wing in the region of influence of said stagnation point and mounted to move responsive to change in magnitude of air pressure caused by movement of said stagnation point, means elastically urging the vane towards an idle position in a direction opposite to that in which it is urged to move by the air pressure acting thereon, whereby the orientation of the vane with respect to the airplane wing is a function of the location of the stagnation point on the wing, and means for continuously varying said electrical characteristic responsive to the orientation of the vane.

4. The combination with an airplane wing having a stagnation point which shifts over the nose of the wing with variation in angle of attack, of an electrical element having a variable electrical characteristic, a vane projecting from the nose of said wing in the region of influence of said stagnation point and mounted to move responsive to change in magnitude of air pressure caused by movement of said stagnation point, means elastically urging the vane towards an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said electrical characteristic responsive to the orientation of the vane, an electrical utilization mechanism adapted to be regulated by a lift ratio, and circuit means connecting said utilization mechanism for control by said electrical characteristic.

5. An airplane instrument comprising an electrical element having a variable electrical characteristic, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said electrical characteristic responsive to the orientation of the vane, and an electrical circuit including said element, said circuit including a second electrical element having an electrical characteristic which is continuously variable responsive to an aerodynamic factor of the airplane other than the aforesaid magnitude of air pressure and which factor modifies the lift ratio, the combined effect of the varying electrical characteristics of said two elements passing through a null point corresponding to a predetermined lift ratio.

6. An airplane instrument comprising an electrical element having a variable electrical characteristic, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said electrical characteristic responsive to the orientation of the vane, an electrical circuit including said element, said circuit including a second electrical element having an electrical characteristic which is continuously variable responsive to an aerodynamic factor of the airplane other than the aforesaid magnitude of air pressure and which factor modifies the lift ratio, the combined effect of the varying electrical characteristic of said two elements passing through a null point corresponding to a predetermined lift ratio, and adjusting means in the electrical circuit ftor varying the null point to correspond to different preselected lift ratios.

7. The combination with an airplane wing having a stagnation point which shifts over the nose of the wing with variation in angle of attack, of an electrical element having a variable electrical characteristic, a vane projecting from the nose of the wing in the region of influence of the shifting stagnation point and mounted to move responsive to change in magnitude of air pressure caused by movement of said stagnation point, means elastically urging the vane towards an idle position in a direction opposite to that in which it is urged to move by the air pressure acting thereon whereby the orientation of the vane with respect to the airplane wing is a function of the location of the stagnation point on the wing and therefore of lift ratio, means for continuously varying said electrical characteristic responsive to the orientation of the vane, and an electrical circuit including said element, said circuit including a second electrical element having an electrical characteristic which is continuously variable responsive to an aerodynamic factor of the airplane other than the aforesaid magnitude of air pressure and which factor modifies the lift ratio, the combined effect of the varying electrical characteristic of said two elements passing through a null point corresponding to a predetermined lift ratio.

8. An airplane instrument comprising an electrical element having a variable output voltage, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing, and means for continuously varying said output voltage responsive to the orientation of the vane.

9. An airplane instrument comprising an electrical element having a variable electrical characteristic which varies through a null point, a vane projecting from the nose of an airplane wing in the region of influence of the shifting stagnation point on said nose and mounted to move responsive to change in magnitude of air pressure caused by movement of said stagnation points, means elastically urging the vane toward an idle position in a direction opposite to that in which it is urged to move by the air pressure acting thereon, whereby the orientation of the vane with respect to the airplane wing is a function of the location of the stagnation point on the wing, and means for continuously varying said electrical characteristic responsive to the orientation of the vane.

10. An airplane instrument comprising an electrical element having a variable electrical characteristic which varies through a null point, means to adjustably shift said null point, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing, and means for continuously varying said electrical characteristic responsive to the orientation of the vane.

11. An airplane instrument comprising an electrical element having a variable polarized electrical characteristic, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing, and means for continuously varying the magnitude and sense of said electrical characteristic responsive to the orientation of the vane.

12. An airplane instrument comprising an electrical element having a variable electrical characteristic which varies through a null point, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing, means for continuously varying the magnitude of said electrical characteristic on both sides of said null point responsive to the orientation of the vane, and means oppositely polarizing said electrical characteristic on opposite sides of said null point.

13. An airplane instrument comprising an electrical element having A.C. output voltage which is variable in magnitude on both sides of a null point, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing, means for continuously varying said A.C. voltage responsive to the orientation of the vane, and means to change said A.C. voltage to a D.C. voltage having one sense on one side of the null point and an opposite sense on the other side of the null point.

14. An airplane instrument comprising a pair of electrical elements, each of which has a variable electrical characteristic, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing, and means for continuously varying said electrical characteristics of said elements in opposite directions responsive to the orientation of the vane.

15. An airplane instrument comprising a pair of electrical elements, each of which has a variable electrical characteristic, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said electrical characteristics of said elements in opposite directions responsive to the orientation of the vane, and means connecting said elements in a null point circuit, the null point of which corresponds to a predetermined lift ratio.

16. An airplane instrument comprising a pair of electrical elements, each of which has a variable electrical characteristic, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said electrical characteristics of said elements in opposite directions responsive to the orientation of the vane, a pair of series-connected variable impedances, means connecting said elements in series with one another and across said series-connected impedances, and means connecting the junction between the impedances with the junction between the elements whereby to provide a null point circuit, the null point of the circuit corresponding to a predetermined lift ratio.

17. An airplane instrument comprising a pair of electrical elements, each of which has a variable electrical characteristic, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said electrical characteristics of said elements in opposite directions responsive to the orientation of the vane, an impedance, and means connecting said elements to said impedance to provide a zero voltage drop across the impedance at a predetermined lift ratio.

18. An airplane instrument comprising a pair of electrical elements, each of which has a variable electrical characteristic, a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said electrical characteristics of said elements in opposite directions responsive to the orientation of the vane, an impedance, circuit means connecting said elements to said impedance to produce a zero voltage drop across the impedance at a predetermined lift ratio, and an adjustable member in the circuit means to render the voltage drop across the impedance equal to zero for different lift ratios.

19. An airplane instrument comprising a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, a pair of electrical elements each of which has a variable electrical characteristic, said elements being located in the airplane wing physically adjacent said vane, means for continuously varying said electrical characteristics of said elements responsive to the orientation of the vane, movement of the vane in any specific direction creating opposite changes in the electrical characteristics of said elements, and a null point circuit connected to said elements, said circuit including an impedance physically remote from said elements and having a variable electrical characteristic which varies through zero responsive to changes in the values of the electrical characteristics of said elements, the zero value of the said electrical characteristic of the impedance corresponding to a predetermined lift ratio.

20. An airplane instrument comprising a vane projecting from the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing, a pair of inductances, means generating a pulsating electro-magnetic field, and means variably linking said field with said inductances as a function of the orientation of the vane so that said inductances will generate voltages which change with change in position of said vane.

21. An airplane instrument as set forth in claim 20 wherein rectifiers are provided for rectifying the outputs of the inductances and wherein the rectifiers are connected to opposite ends of an impedance whereby the voltage drop across the impedance varies through zero and is a function of the lift ratio, the zero voltage drop corresponding to a predetermined lift ratio.

22. An airplane instrument comprising an electrical element having a variable electrical characteristic, a vane located in the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for varying said electrical characteristic responsive to the orientation of the vane, another electrical element having a variable electrical characteristic, means varying said second electrical characteristic responsive to change in setting of a flap in the wing, circuit means connecting said elements for electrically combining the effects of change in setting of the flap and change in position of the stagnation point on the nose of the wing so as to provide an electrical characteristic which is a function of lift ratio modified by flap position, and an electrical utilization mechanism adapted to be regulated by such modified lift ratio, said mechanism being connected to said circuit means.

23. An airplane instrument comprising an electrical element having a variable electrical characteristic, a vane located in the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for varying said electrical characteristic responsive to the orientation of the vane, another electrical element having a variable electrical characteristic, means varying said second electrical characteristic responsive to change in a variable other than the position of the stagnation point which affects lift ratio, circuit means connecting said elements for electrically combining the effects of change in said variable and change in position of the stagnation point on the nose of the wing so as to provide an electrical characteristic which is a function of lift ratio modified by said other variable, and an electrical utilization mechanism adapted to be regulated by such modified lift ratio, said mechanism being connected to said circuit means.

24. An airplane instrument as set forth in claim 23 wherein the electrical characteristic of the circuit means is a voltage which varies through zero, the modified lift ratio being a predetermined value at said zero voltage.

25. An airplane instrument as set forth in claim 24 wherein means is provided to selectably render the voltage zero for different predetermined modified lift ratios.

26. An airplane instrument comprising an electrical element having a variable electrical characteristic, a vane located in the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for varying said electrical characteristic responsive to the orientation of the vane, another electrical element having a variable electrical characteristic, means varying said second electrical characteristic responsive to change in setting of a flap in the wing, and null point circuit means connecting said elements for electrically combining the effects of change in setting of the flap and change in position of the stagnation point on the nose of the wing so as to provide an electrical characteristic which is a function of lift ratio modified by flap position and which passes through zero corresponding to a predetermined value of said modified lift ratio.

27. An airplane instrument comprising an electrical element having a variable electrical characteristic, a vane located in the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said electrical characteristic responsive to the orientation of the vane whereby the value of said characteristic is a function of lift ratio, a utilization mechanism having an electrically actuated element adapted to be regulated by lift ratio, an electric bridge at least one leg of which includes said electrically actuated element, said bridge having two pairs of opposite junctions, means connecting one pair of said junctions in series with said first named element, and means supplying a variable potential across the other pair of junctions of the bridge.

28. An airplane instrument comprising an electrical element having a variable electrical characteristic, a vane located in the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said electrical characteristic responsive to the orientation of the vane whereby the value of said characteristic is a function of lift ratio, plural utilization mechanisms, each having an electrically actuated element adapted to be regulated by the lift ratio, plural electrical bridges, each having in at least one leg one of said actuated elements, each bridge having two pairs of opposite junctions, means connecting one pair of junctions of each of said bridges in series with said first named element, and means supplying an electrical characteristic across the other pair of junctions of each of said bridges, at least one of the electrical characteristics applied by said last named means being variable.

29. An airplane instrument comprising an electrical element having a variable voltage, a vane located in the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said voltage responsive to the orientation of the vane whereby the value of said voltage is a function of lift ratio, a utilization mechanism adapted to be regulated by the lift ratio, said mechanism including a pair of polarized relays each having an actuated element, a bridge having said actuated elements in different legs thereof, means connecting two opposite junctions of said bridge in series with said first named element, and means supplying a variable voltage to the other two junctions of the bridge whereby to adjust the regulation of the utilization mechanism by lift ratio.

30. An airplane instrument comprising an electrical element having a variable voltage, a vane located in the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said voltage responsive to the orientation of the vane whereby the value of said voltage is a function of lift ratio, an electrical meter adapted to indicate lift ratio, an electrical bridge having said meter in a leg thereof, means connecting two opposite junctions of said bridge in series with said first named element, and means for applying a variable voltage to the other two junctions of said bridge whereby to vary the lift ratio indicated by the meter.

31. An airplane instrument comprising an electrical element having a variable voltage, a vane located in the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said voltage responsive to the orientation of the vane whereby the value of said voltage is a function of lift ratio, an electrical meter adapted to indicate lift ratio, an electrical bridge having said meter in a leg thereof, means connecting two opposite junctions of said bridge in series with said first named element, and means for applying selectable predetermined different voltages to the other two junctions of said bridge whereby to vary in predetermined steps the lift ratio indicated by the meter.

32. An airplane instrument comprising an electrical element having a variable voltage, a vane located in the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for continuously varying said voltage responsive to the orientation of the vane whereby the value of said voltage is a function of lift ratio, an electrical utilization mechanism having an electrically actuated element adapted to be regulated by lift ratio, a bridge at least one leg of which includes said electrically actuated element, means connecting two opposite junctions of said bridge in series with said first named element so as to be controlled by the voltage output of said first named element, and means connecting between the other two junctions of the bridge a source of voltage selectively variable to take into account conditions affecting the operation of the airplane whereby to adjust the regulation of the utilization mechanism by lift ratio.

33. An airplane instrument comprising an electrical element having a variable electrical characteristic, a vane located in the nose of an airplane wing in the region of influence of the shifting stagnation point on said nose and mounted to move responsive to change in magnitude of air pressure caused by movement of said stagnation point, means elastically urging the vane toward an idle position in a direction opposite to that in which it is urged to move by the air pressure acting thereon, whereby the orientation of the vane with respect to the airplane wing is a function of the location of the stagnation point on the wing and therefore of lift ratio, means for varying said electrical characteristic responsive to the orientation of the vane, a second electrical element having a variable characteristic, an acceleration responsive thrust sensing element, means controlling the second electrical element responsive to the thrust sensing element, and circuit means connecting the two electrical elements to provide an electrical signal which is a function of lift ratio, corrected to include increased maximum lift available upon increased thrust.

34. An airplane instrument comprising a first electrical element having a variable electrical characteristic, a first sensing means sensitive to the lift ratio of a wing of an airplane, means controlling the first electrical element for varying said electrical characteristic thereof responsive to the first sensing means so that said electrical characteristic of the first element is responsive to the lift ratio of the wing of the airplane, a second electrical element having a variable electrical characteristic, a second sensing means sensitive to the thrust of the airplane, means controlling the second electrical element for varying said electrical characteristic thereof responsive to the second sensing means so that said electrical characteristic of the second element is responsive to the thrust of the airplane, circuit means connecting the two electrical elements to provide an electrical signal which is a function of the lift ratio of the wing of the airplane corrected to include increased maximum lift available upon increased thrust, and a utilization mechanism inherently regulatable by a lift ratio, said mechanism being connected to be controlled by said electrical signal of the circuit means.

35. An airplane instrument as set forth in claim 34 wherein the utilization mechanism is an indicator.

36. An airplane instrument as set forth in claim 34 wherein the utilization mechanism is a meter.

37. An airplane instrument as set forth in claim 34 wherein the utilization mechanism is an autopilot system.

38. An airplane instrument as set forth in claim 34 wherein the means sensitive to the thrust of the airplane is inertia controlled.

39. An airplane instrument comprising a first electrical element having a variable electrical characteristic, a first sensing means sensitive to the lift ratio of a wing of an airplane, means controlling the first electrical element for varying said electrical characteristic thereof responsive to the first sensing means so that said electrical characteristic of the first element is responsive to the lift ratio of the wing of the airplane, a second electrical element having a variable electrical characteristic, a second sensing means sensitive to the thrust of the airplane, means controlling the second electrical element for varying said electrical characteristic thereof responsive to the second sensing means so that said electrical characteristic of the second element is responsive to the thrust of the airplane, a third electrical element having a variable electrical characteristic, a third sensing means sensitive to the flap setting of the wing, means controlling the third electrical element for varying said electrical characteristic thereof responsive to the third sensing means so that said electrical characteristic of the third element is responsive to the flap setting of the wing, circuit means connecting the three electrical elements to provide an electrical signal which is a function of lift ratio of the wing of the airplane corrected to include increased maximum lift available upon increased thrust and variation in maximum lift available upon change in flap setting, and a utilization mechanism inherently regulatable by a lift ratio, said mechanism being connected to be controlled by said electrical signal from the circuit means.

40. An airplane instrument as set forth in claim 39 wherein the utilization mechanism is an autopilot system.

References Cited in the file of this patent

UNITED STATES PATENTS

| 1,451,923 | Pierce | Apr. 17, 1927 |
| 2,008,885 | Upson | July 23, 1935 |
| 2,050,629 | Quereau et al. | Aug. 11, 1936 |
| 2,193,077 | Saxman | Mar. 12, 1940 |
| 2,328,384 | Lacoe | Aug. 31, 1943 |
| 2,414,318 | Middel | Jan. 14, 1947 |
| 2,486,779 | Fairbank | Nov. 1, 1949 |
| 2,553,983 | Saxman | May 22, 1951 |
| 2,579,617 | Schaevitz | Dec. 25, 1951 |
| 2,579,902 | Carbonara et al. | Dec. 25, 1951 |
| 2,624,529 | Greene | Jan. 6, 1953 |
| 2,662,706 | Gille | Dec. 15, 1953 |

FOREIGN PATENTS

| 601,971 | Great Britain | May 18, 1948 |
| 660,854 | Great Britain | Nov. 14, 1951 |